United States Patent [19]
Birch et al.

[11] Patent Number: 6,044,452
[45] Date of Patent: *Mar. 28, 2000

[54] METHOD FOR SYMMETRICALLY PROCESSING

[75] Inventors: Kenneth Birch; Paul Petersen, both of Boise; Todd Farrell, Meridian, all of Id.

[73] Assignee: Micron Electronics, Inc., Nampa, Id.

[ * ] Notice: This patent is subject to a terminal disclaimer.

[21] Appl. No.: 08/880,085

[22] Filed: Jun. 20, 1997

[51] Int. Cl.[7] ...................................................... G06F 15/76
[52] U.S. Cl. ............................................. 712/28; 710/101
[58] Field of Search ..................................... 395/284, 830, 395/729, 820.16, 820.28; 712/1–22, 28, 16; 710/101, 104, 10

[56] References Cited

U.S. PATENT DOCUMENTS

| | | | |
|---|---|---|---|
| 5,436,857 | 7/1995 | Nelson et al. | 364/708.1 |
| 5,555,430 | 9/1996 | Gephardt et al. | 395/800 |
| 5,566,349 | 10/1996 | Trout | 395/840 |
| 5,579,528 | 11/1996 | Register | 395/671 |
| 5,598,537 | 1/1997 | Swanstrom et al. | 395/281 |
| 5,598,539 | 1/1997 | Gephardt et al. | 395/281 |
| 5,625,829 | 4/1997 | Gephardt et al. | 395/284 |
| 5,724,529 | 3/1998 | Smith et al. | 395/309 |
| 5,729,762 | 3/1998 | Kardoch et al. | 395/842 |
| 5,805,841 | 9/1998 | Klein | 395/299 |
| 5,864,659 | 1/1999 | Kini . | |
| 5,923,847 | 7/1999 | Hagersten et al. . | |

OTHER PUBLICATIONS

"MultiProcessor Specification", Version 1.4, Intel Corporation, Aug. 1996.
"Microsoft Windows NT Server Networking Guide", Chapter 1, Windows NT Networking Architecture, Microsoft Corporation, 1996, pp. 7–8.
Pentium Pro Family Developer's Manual, vol. 3: Operating System Writer's Manual, Chapter 7, Multiple Processor Management, Intel Corporation, 1997, pp. 7–1–7–45.
PCI System Architecture, 1995, pp. 9–35.

*Primary Examiner*—John A. Follensbee
*Attorney, Agent, or Firm*—Trop, Pruner, Hu & Miles, P.C,

[57] ABSTRACT

A method of processing comprising first connecting a desk top computer to a portable computer; and then symmetrically processing.

9 Claims, 2 Drawing Sheets

METHOD FOR SYMMETRICALLY PROCESSING

This application is related to co-pending U.S. patent application Ser. No. 08/879,400, filed on Jun. 20, 1997 and entitled Computer System Capable of Symmetrical Processing.

BACKGROUND OF THE INVENTION

1. Field of the Invention

The present invention relates generally to the field of computer systems and more particularly to a computer system whereby a portable computer is connected to a desk top computer such that symmetrical processing is enabled.

2. Description of Related Art

Many people have the need for both a portable computer and a desk top computer. Current computer systems exist in which a portable computer can be connected to a docking station to be used as a desk top computer. These docking stations do not have a separate processor. Rather, the processor of the portable computer is used to run the docking station when the portable computer is connected to the docking station. The docking station is, therefore, not capable of operating independently when the portable computer is not attached. Thus, a current docking station is in essence merely a bus extender which connects the portable computer to peripheral devices such as a monitor, keyboard, PCMCIA slots, PCI slots, etc. Because such docking stations are not capable of operating independently, they cannot function unless the portable computer is attached.

SUMMARY OF THE INVENTION

A method of processing comprising first connecting a desk top computer to a portable computer; and then symmetrically processing

Figure 1:
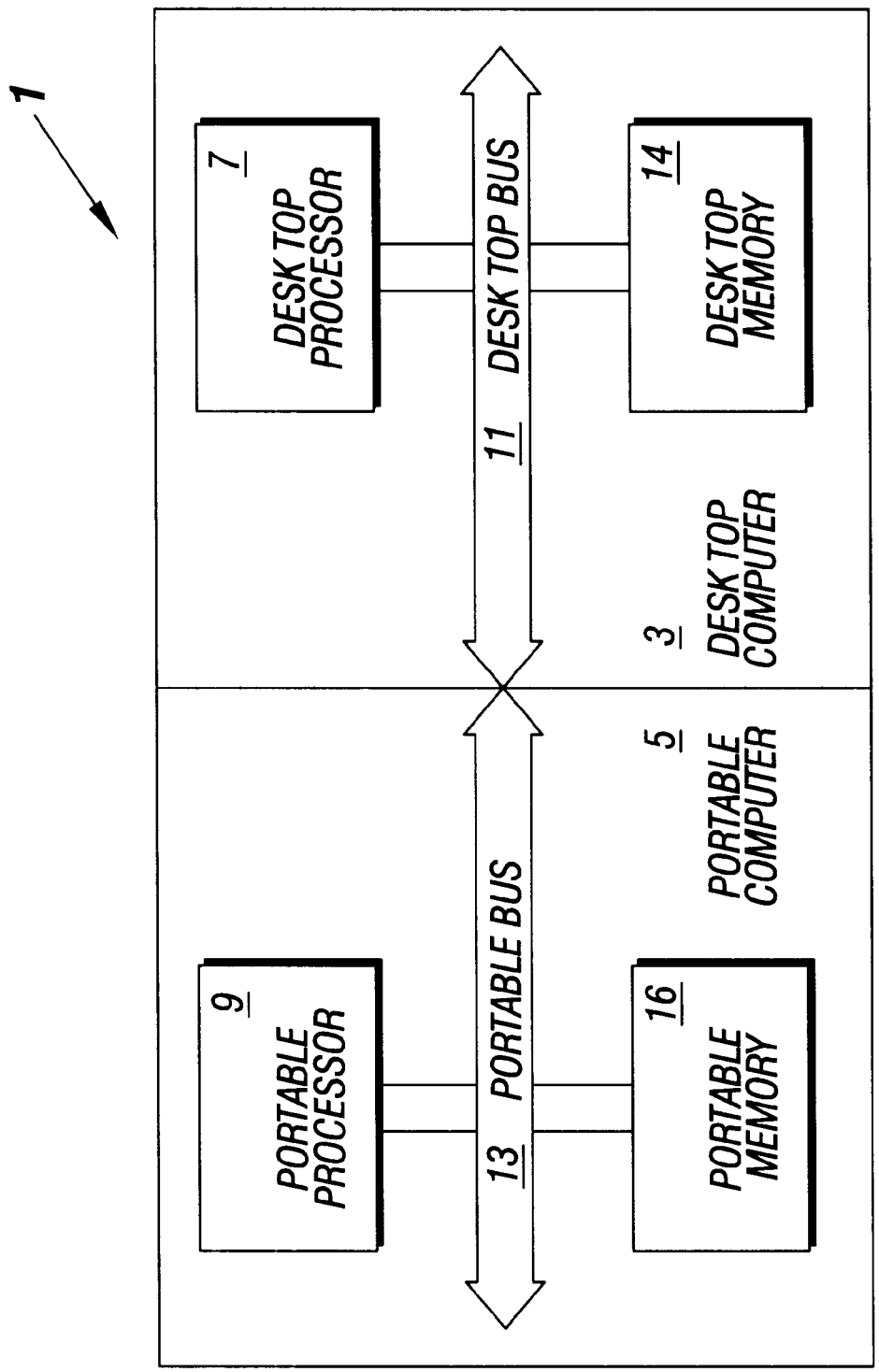
FIG. 1 illustrates a block diagram of the computer system including the desk top computer and the portable computer.

The invention is not limited in its application to the details of construction and the arrangements of the components set forth in the following description or illustrated in the drawings. The invention is capable of other embodiments or of being practiced or carried out in various ways. Also, it is to be understood that the terminology and phraseology employed herein is for purpose of description and illustration and should not be regarded as limiting. Like reference numerals are used to indicate like components.

DESCRIPTION OF ILLUSTRATIVE EMBODIMENTS

Illustrative embodiments of the invention are described below as it may be implemented using standard engineering design techniques. In the interest of clarity, not all features of an actual implementation are described in this specification. It will of course be appreciated that in the development of any such actual implementation, numerous implementation-specificdecisions will typically be made to achieve the developers' specific goals, such as compliance with system-related and business-related constraints, and such decisions can be expected to vary from one implementation to another. Moreover, it will be appreciated that such a development effort may be complex and time-consuming, but will nevertheless be a routine undertaking of computer system design for those of ordinary skill having the benefit of this disclosure.

Referring now to FIG. 1, a computer system 1 includes a desk top computer 3 and a portable computer 5. It is contemplated that the desk top computer 3 and the portable computer 5 can be configured in a variety of ways. In one embodiment, the desk top computer 3 is configured similar to a standard desk top computer and the portable computer 5 is a hand held or palm top computer.

The desk top computer 3 contains a processor 7, referred to as a desk top processor. The desk top processor 7 may also include an advanced programmable interrupt controller (APIC) that is available from Intel Corporation. The portable computer 5 contains a processor 9, referred to as a portable processor. The portable processor 9 may also include an APIC. The desk top processor 7 and the portable processor 9 may be identical processors, such as the Pentium Pro® and PowerPC® processors. However, even if the processors 7 and 9 are not identical, they should be able to accommodate symmetrical processing. Moreover, the desk top computer 3 should also utilize an operating system that can support symmetrical processing such as Windows NT® from Microsoft Corporation.

As shown in FIG. 1, the desk top processor 7 is connected to a desk top bus 11. The desk top bus 11 is used to transfer data to and from the desk top processor 7. The desk top bus 11 may be a conventional CPU bus. Additionally, a desk top memory 14 is connected to the desk top bus 11. The desk top memory 14 may be a random access memory such as a DRAM, EDO DRAM, or an SDRAM.

As is also shown in FIG. 1, the portable processor 9 is connected to a portable bus 13. The portable bus 13 is used to transfer data to and from the portable processor 9. The portable bus 13 may also be a conventional CPU bus. Similarly, a portable memory 16 is connected to the portable bus. The portable memory 16 may be a random access memory such as a DRAM, EDO DRAM, or an SDRAM When the desk top computer 3 is disconnected from the portable computer 5, the desktop computer 3 and the portable computer 5 may operate independently in a stand-alone mode. However, when the portable computer 5 is connected to the desk top computer 3 by connecting the portable bus 13 to the desk top bus 11, the computer system 1 may perform symmetrical processing. With symmetrical processing, the operating system allocates various processing tasks between the desk top processor 7 and the portable processor 9. By allocating the processing workload between the desk top processor 7 and the portable processor 9, the performance of the system may be greatly increased.

Further, when the desk top bus 11 is connected to the portable bus 13, the operating system of the desk top computer 3 and the BIOS of the desk top computer 3 and the portable computer 5 may perform several functions in order to facilitate symmetrical processing. The BIOS of the desk top computer 3 may indicate to the operating system of the desk top computer 3 that symmetrical processing is enabled. The BIOS of the portable computer 5 may then disable the operating system of the portable computer. The operating system of the desk top computer 3 may then receive an indication from BIOS that symmetrical processing is enabled and may identify the type and presence of both processors. The operating system of the desk top computer 3 then may control symmetrical processing of the desk top processor 7 and the portable processor 9. An alternative embodiment is contemplated where symmetrical processing may be enabled after connecting the desk top bus 11 to the portable 13 bus without having to reinitialize the desk top computer 3 and the portable computer 5.

For more information about symmetrical processing see Windows NT® Server Networking Guide, Microsoft Corporation, pp. 7–8, Pentium Pro® Processor Family Developers Manual, Intel Corporation, vol. 3, chapter 7, and Multiprocessor Specification, Intel Corporation, Version 1.4, August 1996.

Figure 2:
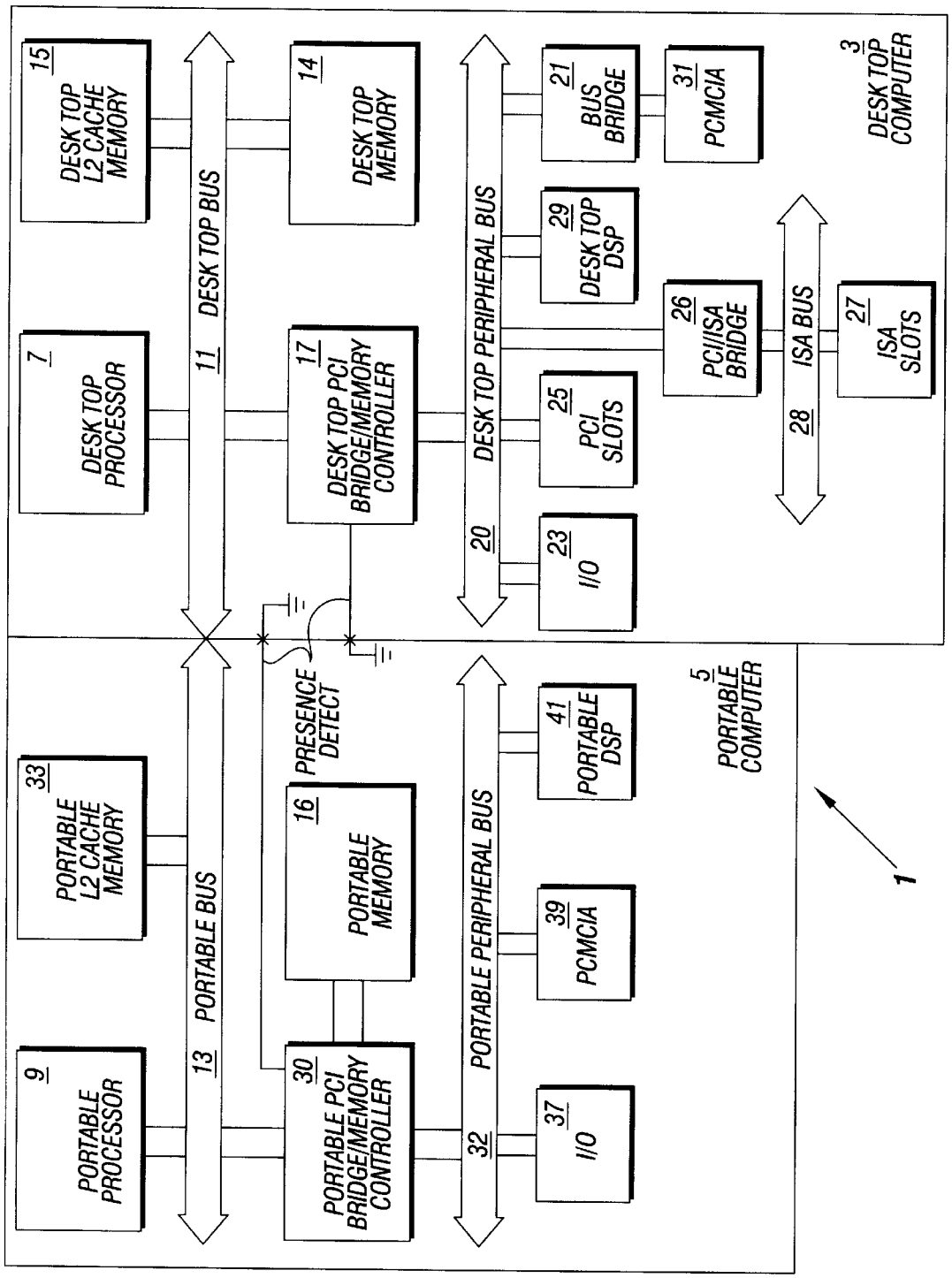
FIG. 2 illustrates a more detailed block diagram of the desk top computer and the portable computer of the computer system.

Referring to FIG. 2, a more detailed illustration of another embodiment of the computer system 1 is shown. In desk top computer 3, a desk top level-2 (L2) cache memory 15 is connected to the desk top bus 11. A cache memory is a high speed memory used to anticipate data to be accessed in system memory by the processor and temporarily store the data. The use of a cache memory increases the performance of a computer by reducing memory access delays. The desk top L2 cache memory 15 is a conventional L2 cache memory.

Further, a desk top specialized PCI bridge/memory controller 17 is also connected to the desk top bus 11. The desk top specialized PCI bridge/memory controller 17 utilizes a presence detect input which will detect when the system is being utilized in a multiple processing environment. The desk top PCI bridge/memory controller 17 is used to control and transfer data between the processor, main memory, and peripherals. The desk top PCI bridge/memory controller 17 is further connected to the desk top memory 14.

As shown in FIG. 2, a desk top peripheral bus 20 connects the desk top PCI bridge/memory controller 17 with input/output devices 23, PCI slots 25, a PCI to ISA bridge 26, and a desk top digital signal processor (DSP) 29. The desk top peripheral bus 20 may be a conventional PCI bus. The input/output devices 23 may be, for example, a monitor, keyboard, disk drive, etc. The PCI slots 25 provide PCI standard slots that enable PCI compatible devices such as modems, Local Area Network (LAN) cards, computer expansion cards such as sound and video cards, etc. to be connected through the PCI slots 25 to the desk top peripheral bus 20. In one embodiment, the desk top computer 3 is connected to a LAN via a LAN card connected to one of the PCI slots 25. The PCI to ISA bridge 26 is connected to an ISA bus 28 which is in turn connected to ISA slots 27. The ISA slots 27 provide ISA standard slots that allow ISA compatible devices such as modems, computer expansion cards, etc. to be connected to the desk top peripheral bus 20 through the PCI to ISA bridge 26.

A bus bridge 21 is connected between the desk top peripheral bus 20 and PCMCIA slots 31. The bus bridge provides an interface between the desk top peripheral bus 20 and the PCMCIA slots 31 so that data can be transferred and received at the PCMCIA slots 31 from the desk top peripheral bus 20. The PCMCIA slots 31 are conventional PCMCIA slots adapted to receive conventional PCMCIA cards.

The desk top DSP 29 may be a conventional DSP that can act as a modem, a cellular modem, a sound card, etc.

In one embodiment of the portable computer 5, a portable level-2 (L2) cache memory 33 is connected to the portable bus 13. The portable L2 cache memory 33 may be a conventional L2 cache memory.

During symmetrical processing, both the desk top L2 cache and the portable L2 cache may be utilized. When, for example the desk top processor 7 is accessing data cached in the portable L2 cache 33, it should not receive incorrect data. If the desk top processor 7 modified data, the portable processor 9 should not receive stale data. Both the desk top L2 cache 15 and the portable L2 cache 33 should maintain coherency among themselves, with main memory, and other bus master DMA devices. One method to accomplish this is to utilize conventional cache-coherency protocols such as cache snooping.

Further, a specialized portable PCI bridge/memory controller 30 may be connected to the portable bus 13. The specialized portable PCI bridge/memory controller 30 utilizes a presence detect input which will detect when the system is being utilized in a multiple processing environment. The portable PCI bridge/memory controller 30 is used to control and transfer data between the processor, main memory, and peripherals. The portable PCI bridge/memory controller 30 is further connected to the portable memory 16.

A portable peripheral bus 32 connects the PCI bridge/memory controller 30 to input/output devices 37, PCMCIA slots 39, and a portable digital signal processor (DSP) 41. The portable peripheral bus 32 may be a conventional PCI bus. The input/output devices 37 may be, for example, an LED screen, keypad, etc. The PCMCIA slots 39 are standard PCMCIA slots adapted to receive standard PCMCIA cards and are known by those skilled in the art. The portable DSP 41 may be a conventional DSP that can act as a modem, a cellular modem, a sound card, etc.

What is claimed is:

1. A method of facilitating symmetrical processing comprising the acts of:

(a) indicating to an operating system of a first computer that symmetrical processing is enabled;

(b) disabling an operating system of a second computer when the first and second computers are operatively coupled;

(c) receiving the indication that symmetrical processing is enabled; and (d) controlling symmetrical processing of the first and second computers.

2. The method of claim 1 further comprising identifying the presence of a processor in the first computer and the second computer.

3. The method of claim 1 further comprising identifying a type of processor in the first computer and the second computer.

4. The method of claim 1, wherein indicating to an operating system of a first computer that symmetrical processing is enabled is performed by sending an indication from a BIOS of the first computer to the operating system of the first computer.

5. The method of claim 1, wherein the disabling an operating system of a second computer is performed by a BIOS of the second computer.

6. The method of claim 1, wherein the indication that symmetrical processing is enabled is received by the operating system of the first computer.

7. The method of claim 1, wherein the controlling symmetrical processing of the first and second computers is performed by the operating system of the first computer.

8. A method of facilitating symmetrical processing comprising the acts of:

(a) indicating to an operating system of a first computer that symmetrical processing is enabled;

(b) disabling an operating system of a second computer when the first and second computers are operatively coupled, wherein the disabling is done by a BIOS of the second computer;

(c) receiving the indication that symmetrical processing is enabled; and (d) controlling symmetrical processing of the first and second computers.

9. A method of facilitating symmetrical processing comprising the acts of:

(a) indicating to an operating system of a first computer that symmetrical processing is enabled;

(b) disabling an operating system of a second computer when the first and second computers are operatively coupled;

(c) receiving the indication that symmetrical processing is enabled; and (d) controlling symmetrical processing of the first and second computers, wherein the controlling is done by the operating system of the first computer.

* * * * *